(12) United States Patent
Addy

(10) Patent No.: US 6,810,307 B1
(45) Date of Patent: Oct. 26, 2004

(54) THERMOSTAT HAVING A TEMPERATURE STABILIZED SUPERREGENERATIVE RF RECEIVER

(75) Inventor: Kenneth L. Addy, Massapequa, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/713,991

(22) Filed: Nov. 14, 2003

(51) Int. Cl.$^7$ .............................. G05B 13/00; H04B 1/16
(52) U.S. Cl. ........................ 700/278; 165/287; 455/215; 455/336
(58) Field of Search ..................... 455/84–87, 205, 455/215, 334, 336; 700/275–278, 299, 300; 165/253, 259, 267–269, 287; 236/1 B, 1 C, 91 R, 91 D–91 G

(56) References Cited

U.S. PATENT DOCUMENTS

| | | | | |
|---|---|---|---|---|
| 5,621,756 A | * | 4/1997 | Bush et al. ................. | 375/219 |
| 5,630,216 A | * | 5/1997 | McEwan .................... | 455/215 |
| 5,751,197 A | * | 5/1998 | Boling, III ............... | 331/107 A |
| 5,927,599 A | * | 7/1999 | Kath .......................... | 236/47 |
| 6,046,674 A | * | 4/2000 | Irwin et al. ............. | 340/539.28 |
| 6,118,828 A | * | 9/2000 | Schleifer ................... | 375/317 |
| 6,300,871 B1 | * | 10/2001 | Irwin et al. ............. | 340/539.28 |
| 6,421,535 B1 | * | 7/2002 | Dickerson et al. ......... | 455/338 |
| 6,624,750 B1 | * | 9/2003 | Marman et al. ............ | 340/506 |
| 6,680,673 B1 | * | 1/2004 | Wong .................... | 340/825.69 |
| 2002/0017988 A1 | * | 2/2002 | Irwin ........................ | 340/539 |

* cited by examiner

Primary Examiner—Maria N. Von Buhr
(74) Attorney, Agent, or Firm—Scully, Scott, Murphy & Presser

(57) ABSTRACT

An RF controlled thermostat/controller is disclosed for an HVAC system having a superregenerative RF receiver which uses the temperature sensor of the thermostat for temperature stabilization of the superregenerative RF receiver. The superregenerative RF receiver provides a very low power drain always-on receiver for RF remote control of the thermostat/controller. The thermostat/controller includes a microcontroller with a non-volatile memory. A digital value stored in the non-volatile memory, or a non-volatile memory of a separate component, is used in one of several different embodiments to accurately tune the superregenerative RF receiver.

20 Claims, 3 Drawing Sheets

US 6,810,307 B1

THERMOSTAT HAVING A TEMPERATURE STABILIZED SUPERREGENERATIVE RF RECEIVER

BACKGROUND OF THE INVENTION

The present invention relates generally to an RF (radio frequency) controlled thermostat/controller for an HVAC (heating, ventilation, air conditioning) system having a superregenerative RF receiver which uses the temperature sensor of the thermostat for temperature stabilization. The superregenerative RF receiver provides a very low power drain always-on receiver for RF remote control of the thermostat/controller.

In order to allow RF security devices and other RF remote control devices to interoperate with and control an HVAC (heating, ventilation, air conditioning) system, it is necessary for the RF security devices and other remote control RF transmitter/devices to send RF messages asynchronously to a battery powered RF controlled thermostat/controller in the HVAC system. The messages generated by the RF transmitters must comply with Part 15 of the FCC rules, meaning that they must adhere to strict duty cycle requirements on the transmitted RF messages, which makes it difficult to design a duty-cycled RF receiver compatible with the transmitted RF messages. Various schemes to overcome this problem involve the use of periodically transmitted synchronized RF messages, along with synchronizing schemes to maintain the RF receiver and the transmitted RF message in synchronization. This approach adds complexity and cost to the RF controlled thermostat/controller.

The present invention provides a better solution of using an always-on superregenerative RF receiver which is a very low power drain RF receiver which is maintained in tune by a highly precisely calibrated temperature sensor of the thermostat/controller.

Superregenerative RF receivers are rarely used in modem communications systems because of their poor frequency stability, their wide interference bandwidth, and their difficulty in manufacturing, primarily because each superregenerative RF receiver needs to be individually tuned after its manufacture because of the high Q self-oscillatory nature of the superregenerative RF receiver design.

SUMMARY OF INVENTION

The present invention provides an RF controlled thermostat/controller for an HVAC system having a superregenerative RF receiver which uses the highly precisely calibrated temperature sensor of the thermostat for temperature stabilization thereof. The superregenerative RF receiver provides a very low power drain always-on receiver for RF remote control of the thermostat/controller. The thermostat/controller includes a microcontroller with a non-volatile memory. A digital value stored in the non-volatile memory, or a non-volatile memory of a separate component, is used to accurately tune the superregenerative RF receiver.

BRIEF DESCRIPTION OF THE DRAWINGS

The foregoing objects and advantages of the present invention for a thermostat having a temperature stabilized superregenerative RF receiver may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE INVENTION

Figure 1:
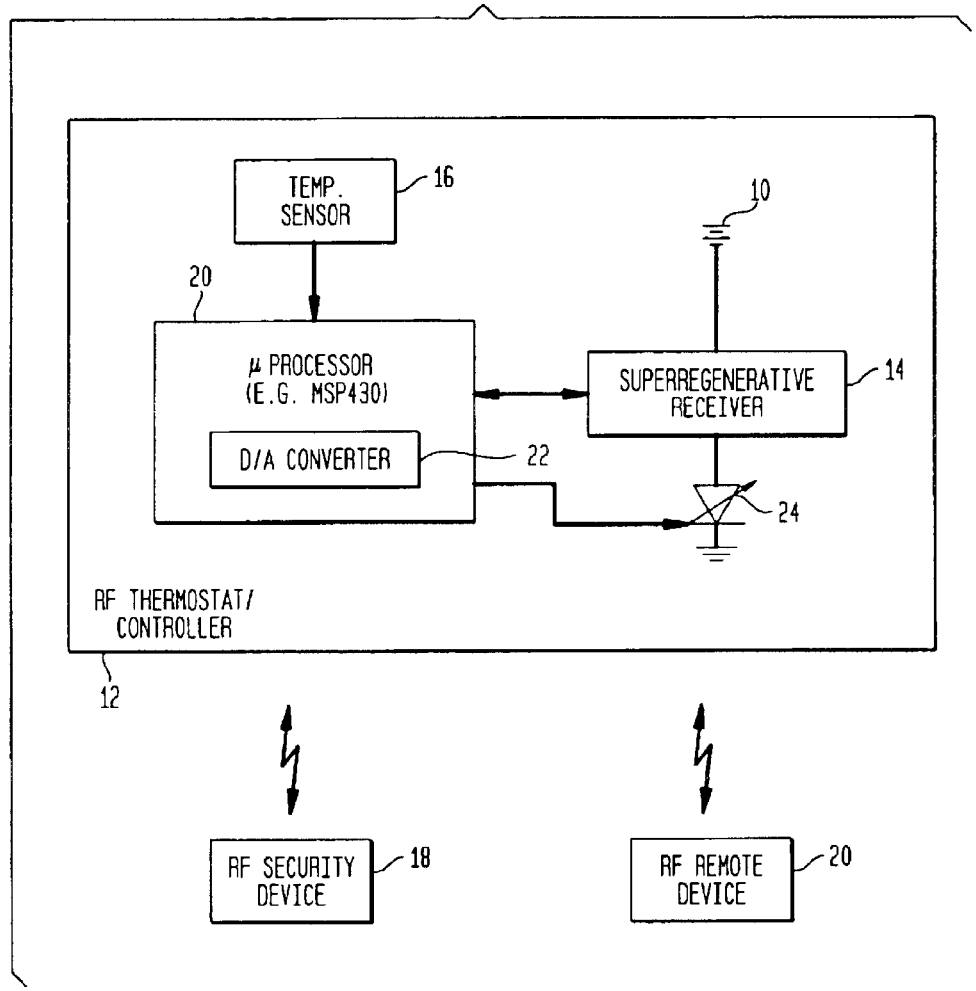
FIG. 1 illustrates a first alternative embodiment of the present invention wherein a stored digital value is input to a digital to analog converter, typically in a microcontroller, the analog output of which is used to adjust a tunable varactor diode which regulates the frequency of a superregenerative RF receiver.

FIG. 1 illustrates a first embodiment pursuant the present invention wherein a battery 10 operated RF (radio frequency) controlled thermostat/controller 12 for an HVAC (heating, ventilation, air conditioning) system is equipped with a superregenerative RF receiver 14. In alternative embodiments, the battery power supply could be replaced by a low voltage, low current power supply, as is available from a thermostat control. The superregenerative RF receiver 14 uses the highly precisely calibrated temperature sensor 16 of the thermostat/controller 12 for temperature stabilization and control of the superregenerative RF receiver 14. The superregenerative RF receiver 14 of the thermostat/controller 12 allows RF security devices 18 and other RF remote control devices 20 to interoperate with and control the HVAC (heating, ventilation, air conditioning) system.

It should also be noted that some microcontrollers include built-in temperature sensors which may be used, however the built-in temperature sensors are generally not as precise and accurate as the highly precisely calibrated temperature sensor of the thermostat/controller.

The always-on low power drain superregenerative RF receiver typically operates on 70 micro-amps, as opposed to 7 milli-amps for other more stable RF receivers, and is maintained in tune by the highly accurately calibrated temperature sensor 16 of the thermostat/controller 12. Superregenerative RF receivers have very poor frequency stability, a wide interference bandwidth, and are difficult to manufacture, primarily because each receiver needs to be individually tuned following manufacture because of the high Q self-oscillatory nature of the receiver design, and the tuning methods using manually adjusted tuning capacitors or inductors are prone to long term drift and are susceptible to variation caused by local temperature variation.

A unique aspect of the superregenerative RF receiver of the thermostat/controller of the present invention is that the thermistor or temperature sensing device 16 of the thermostat 12, which is highly accurately calibrated to an absolute value during the manufacturing process, provides a highly accurate temperature measurement that is used internally by the device to stabilize the tuning of the superregenerative RF receiver 14 input by compensating for the frequency shift caused by temperature variation.

The manufacturing process for the superregenerative RF receiver 14 generates a voltage dependent tuning slope/equation for the superregenerative RF receiver (x=MHz/V), and a temperature slope/equation is known from the stability of the componenets (y=MHz/deg). The microcontroller, in conjunction with a digital to analog converter and the known measured temperature then generates an output of z=y/x= V/deg to compensate for the effects of voltage and temperature variations on the superregenerative receiver. The frequency is measured after manufacture with several digital or analog outputs. Then a computer controlling a manufacturing fixture calculates a best fit curve for the points on the slope, thus providing an approximation to the MHz/V equation.

The present invention provides a highly accurately tuned superregenerative RF receiver in an RF controlled thermostat/controller receiver application for an HVAC system. The RF controlled thermostat/controller includes a microprocessor or microcontroller 20, typically a MSP430 or equivalent, with a non-volatile memory which retains data stored in memory even during power outages and losses. This non-volatile memory, or a non-volatile memory in a separate component as described below in one of the embodiments herein, can be used in one of several technical approaches and embodiments to solve the tuning/drift problem of the superregenerative RF receiver. Following manufacture of the superregenerative RF receiver, the frequency of the superregenerative RF receiver is regulated by a digital value which is permanently stored in the non-volatile memory.

FIG. 1 illustrates a first alternative embodiment of the present invention wherein the stored digital value is input to a digital to analog converter 22, typically in the microcontroller 20, or external thereto in alternative embodiments, the analog output of which is used to adjust a tunable varactor diode 24 which regulates the frequency of the superregenerative RF receiver.

Figure 2:
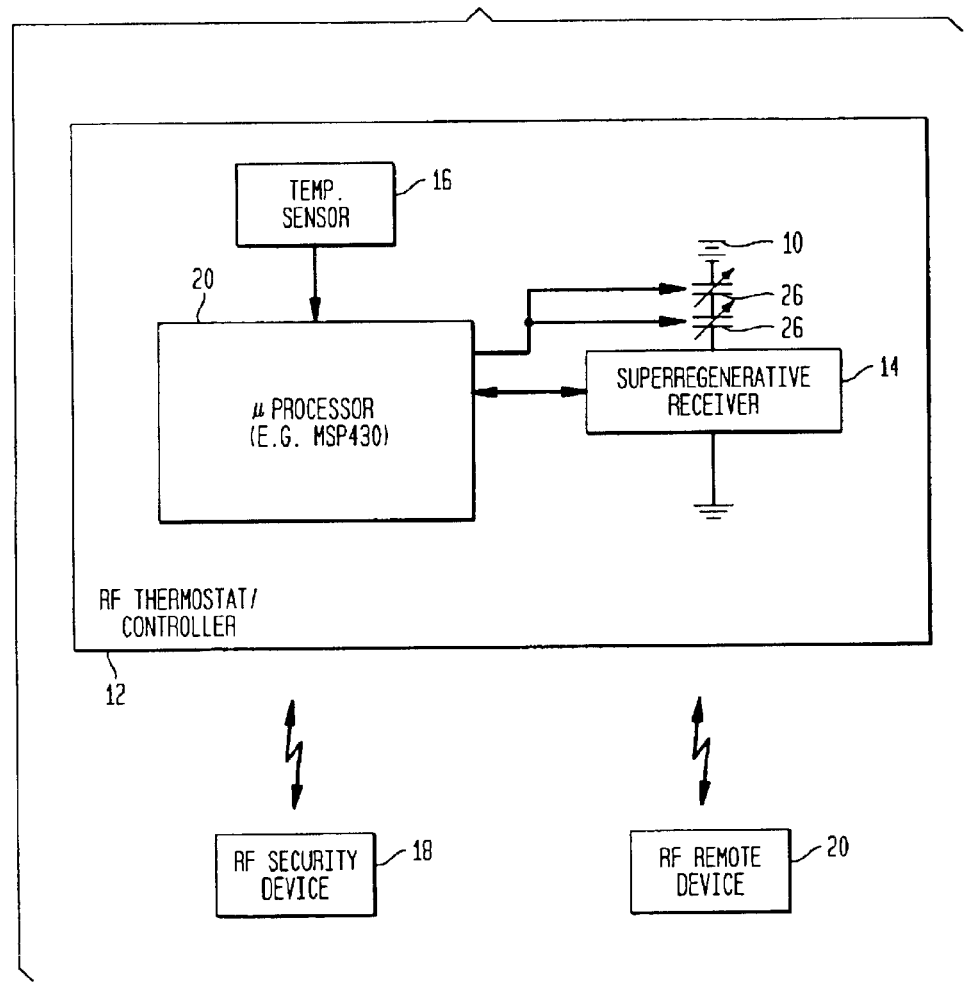
FIG. 2 illustrates a second alternative embodiment of the present invention wherein a stored digital value is used directly to control a series of digitally switched tuning capacitors which regulate the frequency of a superregenerative RF receiver.

FIG. 2 illustrates a second alternative embodiment of the present invention wherein the stored digital value is used directly to control a series of digitally switched tuning capacitors 26 which regulate the frequency of the superregenerative RF receiver.

Figure 3:
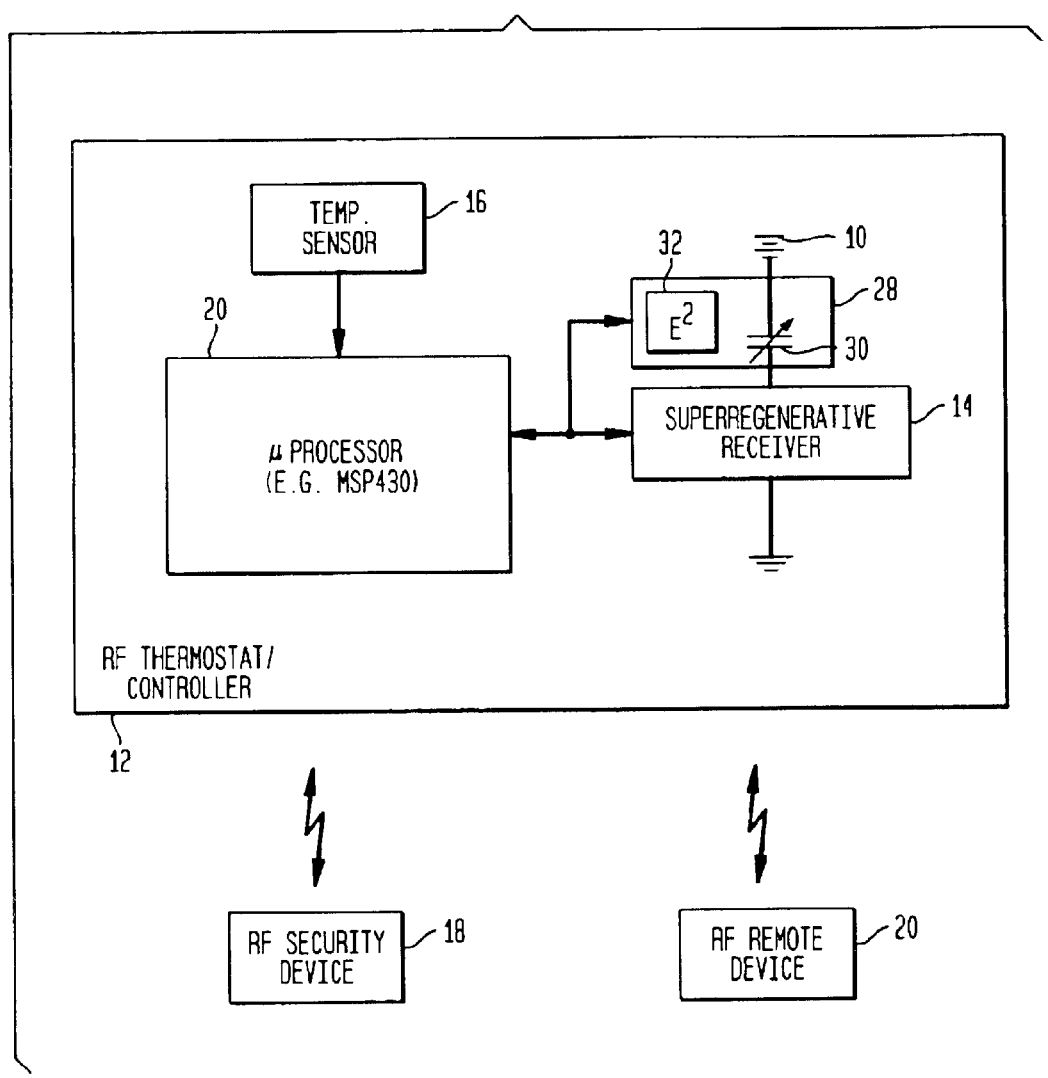
FIG. 3 illustrates a third alternative embodiment of the present invention which employs a non-volatile digitally controlled capacitor wherein a desired capacitive value is stored in an on-chip EEPROM in the component, and is used directly to control a capacitor which regulates the frequency of a superregenerative RF receiver.

FIG. 3 illustrates a third alternative embodiment of the present invention which employs a non-volatile digitally controlled capacitor component 28 that has recently become commercially available from XICOR corporation, Milpitas Calif. 95035-7493. The non-volatile digitally controlled capacitor component 28 can be set to 1 of 32 discrete capacitive 30 values ranging from 7.5 pF to 14.5 pF in 0.20 pF increments. A desired capacitive value can be selected via an up/down interface for the component 28, and is stored in an on-chip EEPROM 32 in the component 28. The chip also has an integrated power-on-recall circuit that restores the preset capacitor value from the EEPROM during power up, thus eliminating the need for microcontroller initialization. Accordingly, the digital value used to tune the superregenerative RF receiver can be stored directly in the on-chip EEPROM of the non-volatile digitally controlled capacitor component 28.

In several disclosed embodiments of the present invention, a digital output of the MSP430 microcontroller is used to control L/C tuning components of the superregenerative RF receiver. In addition thereto, a second output via a D/A internal to the MPS430 microcontroller can control a varactor to compensate for variation in the oscillator semiconductor's operation point due to temperature variation.

While several embodiments and variations of the present invention for a thermostat having a temperature stabilized superregenerative receiver are described in detail herein, it should be apparent that the disclosure and teachings of the present invention will suggest many alternative designs to those skilled in the art.

I claim:

1. An RF controlled thermostat/controller comprising:
   the thermostat/controller including a microcontroller and a temperature sensor;
   a superregenerative RF receiver which uses the temperature sensor of the thermostat for temperature stabilization of the superregenerative RF receiver while providing a very low power drain always-on receiver for RF remote control of the thermostat/controller;
   a non-volatile memory for storing a digital value which is used is used, along with the temperature sensor output, to accurately tune the superregenerative RF receiver.

2. The RF controlled thermostat/controller of claim 1, wherein the microcontroller includes the non-volatile memory as a component thereof.

3. The RF controlled thermostat/controller of claim 1, wherein a tuning component used to accurately tune the superregenerative RF receiver includes the non-volatile memory as a component thereof.

4. The RF controlled thermostat/controller of claim 1, wherein the stored digital value from the non-volatile memory is input to a digital to analog converter, the analog output of which is used to adjust a tunable component which regulates the frequency of the superregenerative RF receiver.

5. The RF controlled thermostat/controller of claim 1, wherein the stored digital value from the non-volatile memory is input to a digital to analog converter, the analog output of which is used to adjust a tunable varactor diode which regulates the frequency of the superregenerative RF receiver.

6. The RF controlled thermostat/controller of claim 1, wherein the stored digital value from the non-volatile memory is a direct input to a digitally controlled tunable component which regulates the frequency of the superregenerative RF receiver.

7. The RF controlled thermostat/controller of claim 1, wherein the stored digital value from the non-volatile memory is a direct input to a digitally switched tuning capacitor which regulates the frequency of the superregenerative RF receiver.

8. The RF controlled thermostat/controller of claim 1, wherein the stored digital value from the non-volatile memory is a direct input to a series of digitally switched tuning capacitors which regulate the frequency of the superregenerative RF receiver.

9. The RF controlled thermostat/controller of claim 1, wherein a non-volatile digitally controlled capacitor component includes the non-volatile memory.

10. The RF controlled thermostat/controller of claim 9, wherein the non-volatile digitally controlled capacitor component includes an EEPROM non-volatile memory.

11. A method of providing RF control for a thermostat/controller including a microcontroller and a temperature sensor comprising:
    using the temperature sensor of the thermostat for temperature stabilization of a superregenerative RF receiver which provides a very low power drain always-on receiver for RF remote control of the thermostat/controller;
    storing a digital value in a non-volatile memory which is used is used, along with the temperature sensor output, to accurately tune the superregenerative RF receiver.

12. The method of claim 11, including storing a digital value in a non-volatile memory of the microcontroller.

13. The method of claim 11, including storing a digital value in a non-volatile memory of a tuning component used to accurately tune the superregenerative RF receiver.

14. The method of claim 11, including applying the stored digital value from the non-volatile memory as an input to a digital to analog converter, the analog output of which is used to adjust a tunable component which regulates the frequency of the superregenerative RF receiver.

15. The method of claim 11, including applying the stored digital value from the non-volatile memory as an input to a digital to analog converter, the analog output of which is used to adjust a tunable varactor diode which regulates the frequency of the superregenerative RF receiver.

16. The method of claim 11, including applying the stored digital value from the non-volatile memory as a direct input to a digitally controlled tunable component which regulates the frequency of the superregenerative RF receiver.

17. The method of claim 11, including applying the stored digital value from the non-volatile memory as a direct input to a digitally switched tuning capacitor which regulates the frequency of the superregenerative RF receiver.

18. The method of claim 11, including applying the stored digital value from the non-volatile memory as a direct input to a series of digitally switched tuning capacitors which regulate the frequency of the superregenerative RF receiver.

19. The method of claim 11, including providing the non-volatile memory in a non-volatile digitally controlled capacitor component.

20. The method of claim 11, including providing the non-volatile memory in an EEPROM in a non-volatile digitally controlled capacitor component.

* * * * *